United States Patent [19]

Livenick et al.

[11] 3,828,210

[45] Aug. 6, 1974

[54] TEMPERATURE COMPENSATED MOUNTING STRUCTURE FOR COUPLED RESONATOR CRYSTALS

[75] Inventors: Corwin E. Livenick, Hickory Hills; Stanley Malinowski, Park Ridge; Robert D. Vann, Elmhurst, all of Ill.

[73] Assignee: Motorola, Inc., Franklin Park, Ill.

[22] Filed: Jan. 22, 1973

[21] Appl. No.: 325,300

[52] U.S. Cl. ............... 310/9.1, 174/DIG. 3, 310/9.4

[51] Int. Cl. ............................................ H01v 7/00

[58] Field of Search ............................ 310/9.1–9.4, 310/8.2, 8.3, 8.9; 179/110 A; 174/DIG. 3

[56] References Cited

UNITED STATES PATENTS

| | | | |
|---|---|---|---|
| 3,046,423 | 7/1962 | Wolfskill et al. | 310/9.1 |
| 3,480,836 | 11/1969 | Aronstein | 174/DIG. 3 |
| 3,487,541 | 1/1970 | Boswell | 174/DIG. 3 |
| 3,566,164 | 2/1971 | Boillat | 310/9.1 |
| 3,643,305 | 6/1970 | Furnival | 310/9.4 X |
| 3,656,217 | 4/1972 | Scott, Jr. et al. | 310/9.1 X |
| 3,707,131 | 12/1972 | Massa | 310/8.2 X |
| 3,723,920 | 3/1973 | Sheahan | 310/8.2 X |

FOREIGN PATENTS OR APPLICATIONS

| | | |
|---|---|---|
| 1,099,888 | 9/1955 | France |

*Primary Examiner*—Gerald Goldberg
*Assistant Examiner*—Mark O. Budd
*Attorney, Agent, or Firm*—Eugene A. Parsons; Vincent J. Rauner

[57] ABSTRACT

A mounting structure for one or more coupled resonator crystal plates with each plate having a number of electrodes, and pairs of the electrodes forming a resonant structure, includes a conductive frame member having portions which are secured to one of the electrodes from separate pairs of electrodes. A number of mounting means are each connected to separate ones of the other electrodes of the pairs of electrodes. The mounting members have a bend formed therein for resiliently supporting the crystal plates and allowing expansion and contraction of the crystal plates with temperature variations. The frame member and mounting members are secured in a mounting base with portions extending through the mounting base for connection to external circuitry.

6 Claims, 4 Drawing Figures

TEMPERATURE COMPENSATED MOUNTING STRUCTURE FOR COUPLED RESONATOR CRYSTALS

BACKGROUND

Quartz crystals used in electronic circuits are positioned within a mounting structure which provides both an electrical connection to and mechanical support for the crystal plate. The mount used is a factor in determining the mechanical reliability and frequency stability of the crystal under varying temperature conditions. Prior art mounting structures require a large holder for a given crystal plate size, and the crystals are subject to breakage and frequency instablity in the presence of mechanical stresses or temperature variation.

In prior art units, quartz crystals, particularly coupled resonator crystals, used for example as intermediate frequency filters in a radio receiver, were each mounted in separate mounting structures. A number of these structures were incorporated in the circuitry in order to provide the entire filter necessary in the intermediate frequency (IF) section of the receiver. With the advent of multi-resonator crystals, that is, crystal plates with more than two electrode pairs thereon, where each pair of electrodes forms a resonator, the mounting structures become larger in order to accommodate the crystal. Furthermore, it has beccome more difficult to mount these multi-resonator crystals in a structure without affecting the normal frequency variations under varying temperature conditions.

SUMMARY

It is therefore an object of this invention to provide an improved mounting structure for multi-resonator crystal plates.

It is another object of this invention to provide an improved mounting structure for multi-resonator crystal plates having a substantially reduced size.

Yet another object of this invention is to provide a mounting structure for multi-resonator crystal plates which does not affect the normal frequency variations over substantial temperature variations.

In practicing this invention, a structure is provided for mounting one or more multi-resonator crystal plates wherein each plate has a number of electrodes, and pairs of the electrodes form a resonant structure. The mounting structure includes a conductive frame member with tabs formed in a top portion. The tabs have a bend, and the crystal plate electrodes from separate ones of the pairs of electrodes are secured to the tabs for resiliently supporting the crystal plates and allowing expansion and contraction of the crystal plates with temperature variations. A number of mounting members are also provided each for connection to one of the other electrodes of the pairs of electrodes. The mounting members also have a bend formed in them for resiliently supporting the crystal plates and allowing expansion and contraction of the crystal plates with temperature variation. The conductive frame member and mounting members are mounted in a mounting base having a first conductive portion and a second non-conductive portion. The mounting members extend through the non-conductive portion for providing separate electrical connections to each electrode pair.

THE DRAWINGS

DETAILED DESCRIPTION

Figure 1:
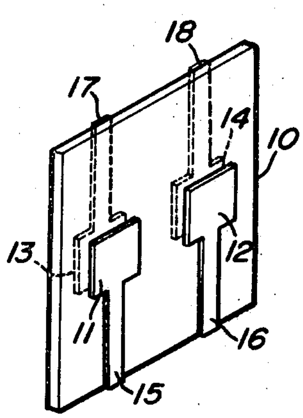
FIG. 1 shows a multi-resonator crystal plate of the type used in the mounting structure of this invention.

Referring to FIG. 1, crystal plate 10 in the preferred embodiment, has a square, rectangular, or round configuration. Two electrodes, 11 and 12, are placed on one major surface; and two electrodes 13 and 14 are plated on the opposite major surface. Electrodes 11 and 13 are axially aligned on the crystal plate major opposite surfaces and form one resonator of the multi-resonator crystal plate. Electrodes 12 and 14 are axially aligned on opposite surfaces of the crystal plate and form a second resonator on the multi-resonator crystal plate 10. Although the embodiment shown in FIG. 1 employes only two resonators, it is to be understood, that this invention is not limited to a mounting structure for mounting two resonator crystal plates but may be employed for mounting a multi-resonator crystal plate employing any number of resonators. Furthermore, any number of multi-resonator crystal plates may be mounted in the mounting structure. Each electrode 11, 12, 13 and 14, respectively, has a portion 15, 16, 17 and 18 extending to the edge of crystal plate 10.

Each resonant structure on crystal plate 10 exhibits a particular frequency variation, with varying temperatures. These variations are due to expansion and contraction of the crystal plate structure itself, and expansion and contraction of the electrodes and electrode pairs formed thereon. Any restraint upon this normal expansion and contraction can cause a shift in the frequency variation of the resonator from its normal frequency variation over the temperature range. Crystal plate 10 must, therefore be mounted in a structure which does not substantially inhibit the expansion and contraction of the crystal plate and electrodes over the temperature range in which the multi-resonator crystal structure will be employed.

Figure 2:
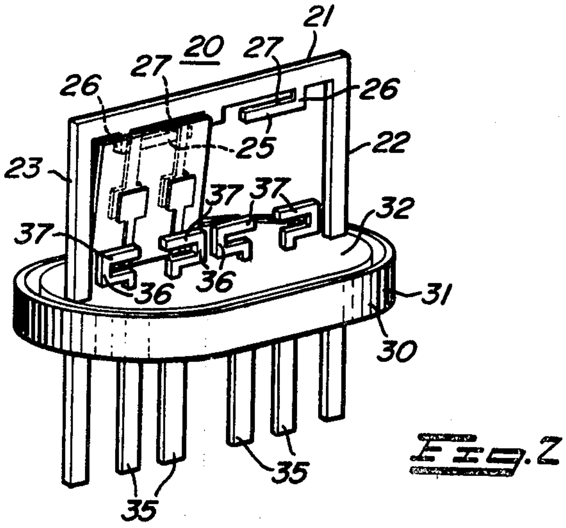
FIG. 2 shows the mounting structure of this invention with a multi-resonator crystal plate mounted in the structure.

Referring to FIG. 2, one multi-resonator crystal plate 10 is shown mounted in the mounting structure of this invention. The mounting structure includes a conductive metal frame 20 having a top member 21 and side members 22 and 23. Mounting tabs 25 are formed in top member 21. Mounting tabs 25 each have a first portion 26 extending transversely from top member 21, and a second portion 27 extending transversely from first portion 26 and at the end of first portion 26 removed from top member 21. First and second portions 26 and 27 form a right angle bend. These right angle bends give tabs 25 a certain amount of resiliency. Portions 17 and 18 of electrodes 13 and 14 are each secured to second portions 27 of tabs 25 for resiliently supporting the crystal plate and allowing expansion and contraction of the crystal plate with temperature variations.

Side members 22 and 23 are secured to a mounting base 30 consisting of an outer conductive apertured shell 31 and an inner, non-conductive, insulating material 32 such as for example borosilicate glass. Borosilicate glass is used because it has the same thermal expansion coefficient as that of the material used to form outer shell 31 in mounting base 30. A portion of side members 22 and 23 extends above mounting base 30, and a second portion extends below mounting base 30.

Conductive mounting members 35 are secured to insulating material 32 in mounting base 30, and have a portion extending below the mounting base and a portion extending above the mounting base. Mounting members 35 in the preferred embodiment, are made from the same material as mounting frame 20 and outer conductive apertures shell 31 of base member 30. In the preferred embodiment, the material is a nickel iron cobalt alloy such as is commonly available under the Trademark "KOVAR".

The portion of mounting members 35 extending above base member 30 includes a U-shaped or bent portion 36. This U-shaped portion has a side portion 37, to which is secured the other electrode from one of the pairs of electrodes secured to tabs 25. In the embodiment shown, in FIG. 1, portions 15 and 16 of electrodes 11 and 12 are secured to portions 37 of two mounting members 35. The resilient U-shaped portion of mounting member 35 supports crystal plate 10 and allows expansion and contraction of the crystal plate with temperature variation. Tabs 25 and the U-shaped portions of mounting members 35, because they are sufficiently resilient, do not inhibit the expansion and contraction of the crystal plate 10 electrodes over the temperature range in which the multi-resonator crystal is employed. Consequently, they will not affect the normal frequency variation of crystal plate 10 over the operating temperature range.

Although a single crystal plate 10 is shown in FIG. 1, a second crystal plate 10 may be mounted in mounting structure 20. The second crystal plate 10 will be secured to the remaining tab 25 and mounting members 35 shown in FIG. 1 in the same manner as the crystal plate 10 is shown. If more crystal plates are to be included in the mounting structure, it can be expanded by lengthening mounting base 30, top member 21, and adding tabs 25 and mounting members 35.

Figure 3:
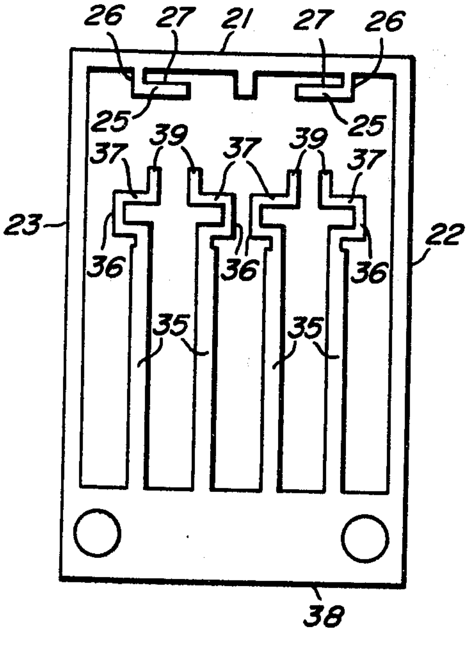
FIG. 3 is another embodiment of the mounting structure of this invention.

Referring to FIG. 3, mounting frame 20 and mounting members 35 are preformed from a flat sheet of conductive material such as "Kovar". In FIG. 3, parts identical to those shown in FIG. 2 will be given identical reference numbers. Mounting frame 20, when etched or stamped from a sheet of material, includes a bottom member 38. Mounting members 35 are formed on bottom member 38. Bottom member 38 may be detached from mounting frame 20 after the entire mounting structure is assembled in order to provide separate electrical connection to each electrode pair via mounting members 35. In the embodiment shown in FIG. 3, mounting members 35 include an extra portion 39 formed at one end of portion 37 on U-shaped portion 36, and extending transverse to portion 37 towards tabs 25. Portions 15 and 16 of electrodes 11 and 12, respectively, in this embodiment, may be secured to portions 39 of mounting members 35. The addition of portion 39 to mounting member 35 adds extra resiliency to mounting members 35. This extra resiliency further enhances the mounting structure's ability to support crystal plates 10 without causing a variation in the frequency of the resonators over the temperature range. By adding portion 39 to members 35, the length of side walls 22 and 23 must be increased. This addition then may only be used where there is sufficient space for the added height of the structure. It is to be understood, however, that portion 39 is not necessary in order to provide sufficient resilience in the mounting structure.

Figure 4:
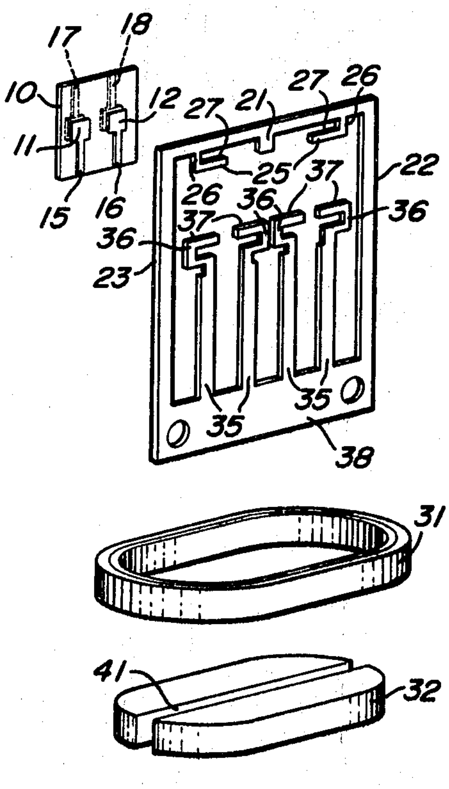
FIG. 4 is an exploded view of the mounting structure and crystal showing the elements as they are to be assembled.

The assembly of mounting structure 20 and crystal plate 10 is best explained by reference to FIG. 4. Inner non-conductive glass insert 32 of base member 30 has an aperture 41 extending therethrough from top to bottom. Glass insert 32 is inserted into outer conductive apertured shell 31. The preformed mounting frame 20 with mounting members 35 formed thereon is inserted through aperture 41 in glass insert 32 with a portion of mounting frame 20 and mounting members 35 extending below mounting base 30, and another portion extending above mounting base 30. The portion extending above mounting base 30 includes top member 21 of mounting frame 20 and U-shaped portions 36 of mounting members 35. The portion extending extending below mounting base 30 includes bottom member 38, portions of side members 22 and 23, and portions of mounting members 35. The assembly is now heated at high temperature in an oven causing the glass to flow and bond to conductive outer shell 31, side members 22 and 23 of mounting frame 20, and mounting members 35. Electrodes 11, 12, 13 and 14 of the crystal plates 10 may then be secured to tabs 25 and mounting members 35 by use of a conductive epoxy cement or by brazing, welding, or soldering. Bottom member 38 is then detached from side members 22 and 23 and mounting members 35 to provide separate electrical connections to one side of each resonator via mounting members 35, and to the other side of the resonators via mounting frame 20.

As can be seen, an improved mounting structure has been provided for multi-resonator crystal plates. The mounting structure has a substantially reduced size and does not affect the frequency response characteristics of the resonators over the temperature range in which the unit will be operative.

We claim:

1. A structure for mounting one or more crystal plates with each plate having a plurality of electrodes thereon with pairs of said electrodes forming a resonant structure, the combination including; a conductive frame member, means for securing thereto one of said crystal plate electrodes from separate pairs of electrodes, a plurality of mounting members each for connection to one of the other electrodes of said pairs of electrodes, said mounting members having a bend formed therein for resiliently supporting said crystal plates and allowing expansion and contraction of said crystal plates with temperature variation, a mounting base having a first conductive portion and second non-conductive portion, said conductive frame member extending through said base member and being mechanically secured thereto, said mounting members extending through said base member non-conductive portion and being mechanically secured thereto.

2. The structure of claim 1 wherein said mounting members each include, a first straight portion extending through said base member non-conductive portion and having first and second ends, and a second portion at said first end of said first portion forming said bend.

3. The structure of claim 2 wherein said second portion is substantially U-shaped having first and second side portions and a bottom portion, said first side portion being secured to said first end of said first portion.

4. The structure of claim 3 wherein said second portion further includes an extension portion extending substantially transverse to said second side portion and having first and second ends, said extension portion first end being secured to said second side portion, said extension portion second end being secured to one of the other electrodes of said pairs of electrodes.

5. The structure of claim 4 wherein said means for securing thereto one of said crystal plate electrodes from separate pairs of electrodes includes, mounting tabs secured to said frame member, said tabs having a bend formed therein for resiliently supporting said crystal plates and allowing expansion and contraction of said crystal plates with temperature variation.

6. A mounting frame for mounting one or more crystal plates with each plate having a plurality of electrodes thereon with pairs of said electrodes forming a resonant structure, said crystal plates exhibiting a particular frequency variation with temperature due to expansion and contraction thereof, the combination including, top, detachable bottom and side conductive members forming a substantially rectangular frame structure, said top member having tabs formed thereon positioned inwardly towards said bottom member, each of said tabs having a bend formed therein for receiving in engagement therewith one of said crystal plate electrodes from separate ones of said pairs of electrodes, said tabs resiliently supporting said crystal plates and allowing expansion and contraction of said crystal plates with temperature variation for maintaining said crystal particular frequency variation with temperature variations, a plurality of mounting members detachable secured to said bottom member and positioned inwardly towards said top member, each of said mounting members being positioned to have secured thereto the other electrode of said pairs of electrodes, said mounting members each including a straight portion having a first and second end and a substantially U-shaped portion having first and second side portions and a bottom portion, said first side portion being affixed to the first end of said straight portion forming a bend therein for resiliently supporting said crystal plates and allowing expansion and contraction of said crystal plates with temperature variation for maintaining said crystal particular frequency variation with temperature variations said second end of said straight portion being detachably affixed to said detachable bottom.

* * * * *